(No Model.) 2 Sheets—Sheet 2.
J. B. HOBBY.
AUTOMATIC ANIMAL TRAP.
No. 542,610. Patented July 9, 1895.
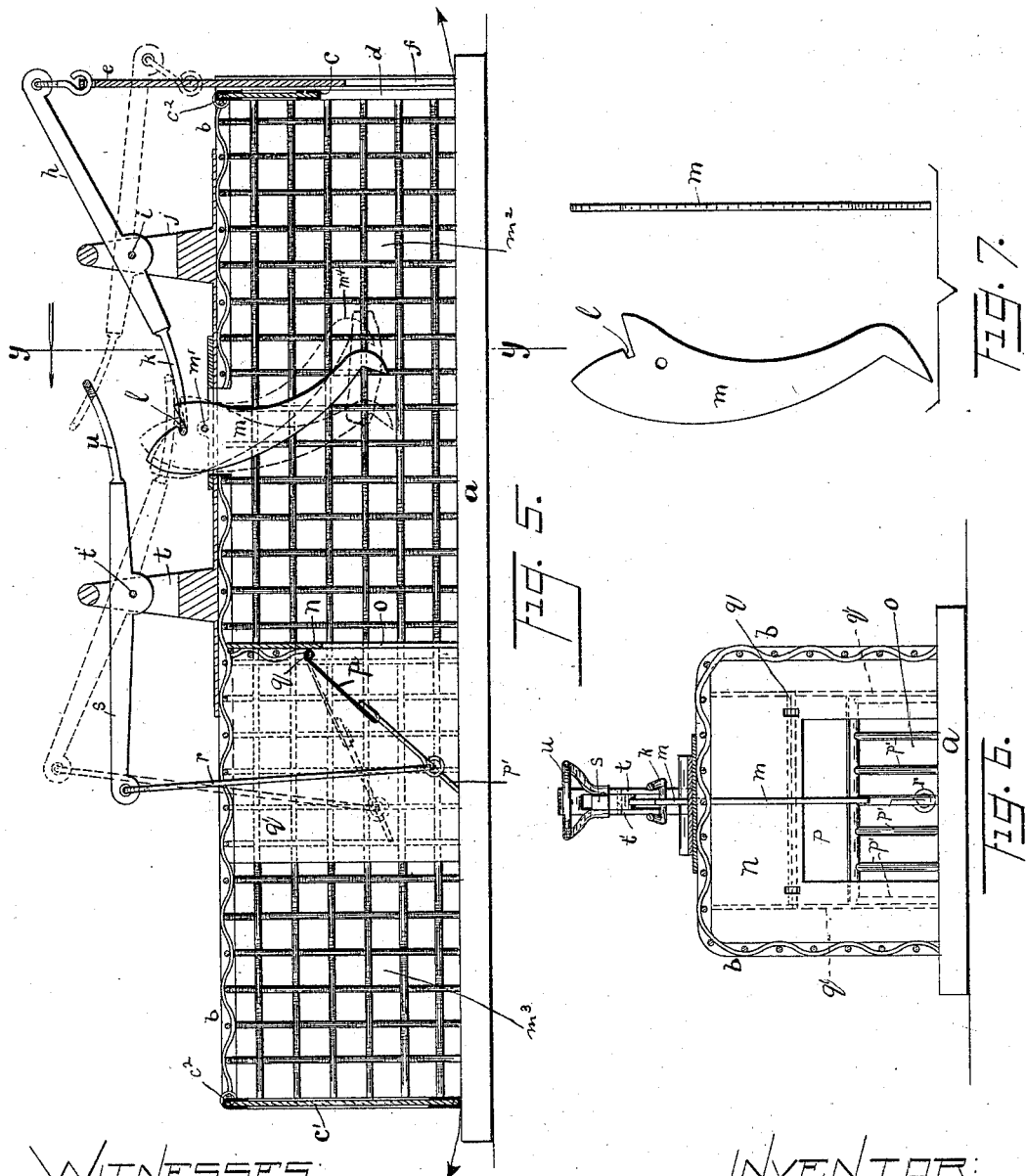
WITNESSES:
Chas. R. Michel
Louis H. Michel
INVENTOR:
JOHN BURTIS HOBBY,
by Oscar A. Michel & Co., ATT'YS.

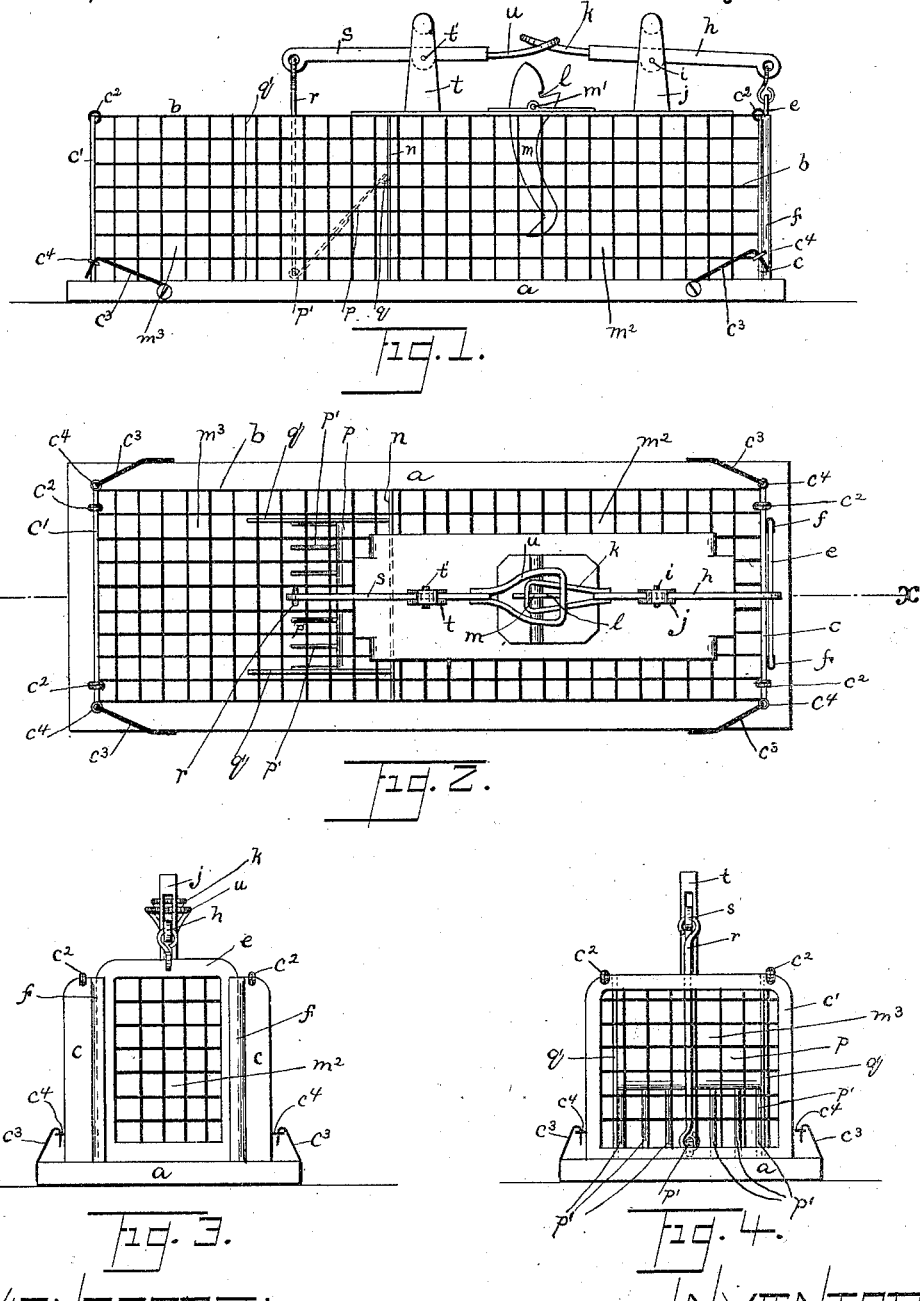

United States Patent Office.

JOHN BURTIS HOBBY, OF NEW YORK, N. Y.

AUTOMATIC ANIMAL-TRAP.

SPECIFICATION forming part of Letters Patent No. 542,610, dated July 9, 1895.

Application filed January 31, 1894. Serial No. 498,548. (No model.)

*To all whom it may concern:*

Be it known that I, JOHN BURTIS HOBBY, a citizen of the United States, residing at New York, in the county of New York and State of New York, have invented certain new and useful Improvements in Automatic Animal-Traps; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to a new and useful improvement in automatic animal-traps, particularly that class which are designed to catch mice, rats, and other small animals; and it consists in a closed compartment, having at either end a door for the ingress or egress of the animal, the compartment being divided into two spaces communicating by means of a door which allows of the passage of the animal in one direction but prevents its return in the opposite direction, the door of one end of the compartment and the door at the partition being combined with mechanism whereby the animal after it enters the first space and nibbles the bait, closes the ingress to the trap and in its passage through the partition door again sets the trap.

The invention also consists in the arrangements and combination of parts hereinafter described, and claimed.

The invention is illustrated in the accompanying drawings, wherein—

Figure 1 is a side elevation of the trap; Fig. 2, a top plan view thereof; Fig. 3, a front, and Fig. 4 a rear, elevation thereof. Fig. 5 is an enlarged longitudinal central section on line $x$ of Fig. 2. Fig. 6 is a cross-section, enlarged, taken on line $y$ of Fig. 5; and Fig. 7 is an enlarged side and end elevation of the bait-hook of the trap.

In said drawings, $a$ represents the floor of the trap, which may be of wood, iron, or other suitable solid substance, and $b$ the network of metal surmounting the same. At either end of the network $b$ are placed walls $c$ and $c'$ which by preference are hinged to the network at $c^2$ to allow them to swing outward as indicated by the arrows in Fig. 5. The walls $c$ and $c'$ are held firmly when closed by the hooks $c^3$ passing through the loop $c^4$ of the walls $c$ and $c'$, as fully indicated on the drawings.

The wall $c$ is provided with an aperture $d$ adapted to be closed by the vertically sliding door $e$ which slides in the grooves $f$ of the wall. This door $e$ is suspended from one end of a lever $h$ which is pivoted or fulcrumed, as at $i$, to the projection $j$ on the roof of the trap. The other end of this lever $h$ is provided with a catch $k$, adapted when that end is depressed to engage the notch $l$ of the bait-hook $m$ which is suspended below the roof of the trap and working on the pivot $m'$. The upper end of the bait-hook forward of the notch $l$ is curved or beveled, as indicated by the letter $l'$, so that when the said catch is brought to bear against said beveled or curved portion the position of the bait-hook will be automatically changed to permit the catch to engage with the notch $l$ and thus automatically set the trap.

Immediately beyond the bait-hook $m$ is placed a partition $n$, which divides the trap into two compartments $m^2$ and $m^3$. This partition $n$ has an aperture $o$ protected by a gate $p$, which is hinged, as at $q$, and is adapted to be swung up and down, as indicated in full and dotted lines, Fig. 5. The gate $p$ is connected near its end with the rod $r$, which in turn is suspended from one end of a lever $s$, which is pivoted, as at $t$, to a projection $t$ on the roof of the trap. The other end of the lever $s$ is provided with a catch $u$, extending directly above the catch end $k$ of lever $h$. On either side of the gate $p$, which at rest occupies a slanting position, is placed the side walls $q'$ to prevent the animal from returning to the first compartment $m^2$ after having entered compartment $m^3$.

The operation is as follows: To bait the trap the hook $c^3$ is released from the loop $c^4$ on the wall $c$, which will allow the wall to be swung outward to enable the person to put the bait on the bait-hook $m$, when the wall $c$ is swung back again to its normal state and fastened, and when this is accomplished the catch-end $k$ of lever $h$ is depressed until the catch $k$ enters the slot $l$ of the bait-hook $m$. In this position the sliding door $e$ is raised and the aperture $d$ opens for the ingress of the animal. When the animal nibbles the bait on the hook $m$ the hook is pulled outward, as indicated by dotted lines $m^4$, Fig. 5. The catch $k$ is then released from the slot $l$ and the door $e$ slides downward in the grooves $f$, closing the aperture $d$ of the trap. The animal is now confined in the first compartment $m^2$ of the trap with but one means of egress, and that through the aperture $o$ of the partition $n$ guarded by gate $p$. When the animal passes through this aperture $o$ it raises the gate $p$, thus elevating the rod $r$, which in turn operates the lever $s$, depressing the catch end $u$, together with the catch $k$ of the lever $h$, which, as indicated in Fig. 5, has been elevated until it rests immediately under and in contact with catch $u$ when the sliding door $e$ is closed, until the catch end $k$ enters the slot $l$ of the bait-hook $m$, when the trap is again set. This operation may be repeated until the trap is filled, the trap needing no attention in the matter of setting after it has once been set. To remove the animals that are caught, the door $c'$, or, if necessary, both doors $c$ and $c'$, may be opened.

The swinging gate $p$ is preferably provided at its lower end with pins or spikes $p'$, which serve to prevent the animal from withdrawing its body after it has once gone a portion of the way through the opening $o$ to enter the compartment $m^3$. The spikes $p'$, when the animal tries to retract itself, will enter its body and pin the animal against the flooring $a$ of the trap.

Having thus described my invention, what I claim as new, and desire to secure by Letters Patent of the United States, is—

1. In an animal trap, the combination of the main compartment, having the ends adapted to be opened or shut, one end having an aperture adapted to be controlled by a vertically-sliding door, a lever adapted to raise and lower said door, a bait hook adapted to engage one arm of said lever and to lock the same when the sliding door is raised, an apertured partition dividing the compartment, a swinging gate guarding said aperture in said partition, a rod and lever operated by said swinging gate, said lever extending over and adapted to depress one end of the lever controlling the sliding door to reset the trap when the swinging gate is operated, substantially as set forth.

2. In an animal trap, the bait hook consisting of a portion $m$, carrying a suitable hook, having a notch $l$, and beveled or curved at the forward portion of its upper end, combined with the lever $h$, having a sliding door secured at one end to close the main chamber of the trap, a catch $k$ at the other end adapted to ride over the beveled upper portion of the bait hook to set the same, and then engage and hold it and the lever, the lever $s$, a connecting rod, and a gate located between the two compartments, whereby the catch lever is actuated to automatically set the trap, substantially as specified.

3. In an animal trap, the main compartment, the swinging end piece $c$, at one end thereof, and provided with the aperture $d$, the pivoted end piece $c'$ at the opposite end of the chamber, and the bait hook suspended from the roof of the chamber and provided with both an inclined surface and a slot or notch $l$, at its upper end; combined with a vertically sliding door $e$, the lever $h$, projection $j$, and catch $k$, the lever being connected with the door $e$, at one end and the catch at the other, and the catch being adapted to engage with the slot or notch, substantially as set forth.

4. The combination in an animal trap, of a compartment divided into two spaces by the apertured partition $n$ and having the ends $c$ and $c'$ adapted to be opened when required one of said ends $c$ being apertured at $d$, a bait hook $m$ provided with the slot $l$ and suspended from the roof of the compartment between the partition $n$ and the apertured end $c$, a vertically sliding door $e$ guarding said aperture $d$ of said end $c$, a lever $h$, fulcrumed at $i$ to a projection $j$ on the roof of the compartment, said door $e$ being suspended from one end of said lever $h$, the other end of said lever $h$ being provided with a catch $k$ adapted when depressed to engage the slot $l$ of the hook $m$ and to be locked therein, a swinging gate $p$ provided with prongs $p'$ and adapted to guard the opening $o$ in said partition $n$, a rod $r$ secured to said gate, a lever $s$, pivoted at $t'$ to a projection $t$ on the roof of the compartment, one end of said rod $r$ being pivoted to one end of said lever $s$, the other end of said lever $s$ being provided with a catch $u$ extending over the catch $k$ of lever $h$ and arranged so that when the gate $p$ is swung upward the rod $r$ will depress the catch $u$ of lever $s$ down upon said catch $k$ of lever $h$ until the said catch $k$ enters slot $l$ of bait hook $m$, substantially as and for the purposes set forth.

In testimony that I claim the invention set forth above I have hereunto set my hand this 27th day of January, 1894.

JOHN BURTIS HOBBY.

Witnesses:
OSCAR A. MICHEL,
ALFRED E. SMITH, Jr.